United States Patent
O'Brien et al.

(10) Patent No.: US 10,586,202 B2
(45) Date of Patent: Mar. 10, 2020

(54) SYSTEMS AND METHODS FOR VALIDATING PRODUCTS TO BE DELIVERED BY UNMANNED AERIAL VEHICLES

(71) Applicant: Walmart Apollo, LLC, Bentonville, AR (US)

(72) Inventors: John J. O'Brien, Farmington, AR (US); Robert L. Cantrell, Herndon, VA (US); David C. Winkle, Bella Vista, AR (US); Donald R. High, Noel, MO (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 16/049,420

(22) Filed: Jul. 30, 2018

(65) Prior Publication Data
US 2019/0066047 A1 Feb. 28, 2019

Related U.S. Application Data
(60) Provisional application No. 62/551,350, filed on Aug. 29, 2017.

(51) Int. Cl.
*G06Q 10/08* (2012.01)
*B64C 39/02* (2006.01)

(52) U.S. Cl.
CPC ....... *G06Q 10/0838* (2013.01); *B64C 39/024* (2013.01); *B64C 2201/128* (2013.01)

(58) Field of Classification Search
CPC .............. G06Q 10/0838; B64C 39/024; B64C 2201/128
See application file for complete search history.

(56) References Cited

U.S. PATENT DOCUMENTS 8,068,950 B2    11/2011  Duggan
9,359,074 B2     6/2016  Ganesh
(Continued)

FOREIGN PATENT DOCUMENTS

CN    205353316    6/2016
WO    2016039882   3/2016
(Continued)

OTHER PUBLICATIONS

"Knut Alicke, Supply Chain 4.0 in consumer goods, Feb. 3, 2016" (Year: 2016).*

(Continued)

*Primary Examiner* — Kevin H Flynn
*Assistant Examiner* — Ibrahim N El-Bathy
(74) *Attorney, Agent, or Firm* — Fitch, Even, Tabin & Flannery, LLP

(57) ABSTRACT

In some embodiments, methods and systems are provided that provide for validating products to be delivered to customers via unmanned aerial vehicles. Each UAV includes sensors configured to detect at least one actual physical characteristic and/or actual identifying characteristic of a product being loaded into the UAV and/or being transported by the UAV to a delivery destination. The actual physical characteristic information and/or the actual identifying information detected by the sensors is compared to predefined physical characteristic information and/or predefined identifying information stored in an electronic database in order to validate that the product that is being loaded into the UAV and/or being transported by the UAV is not damaged and corresponds to the order being fulfilled. If validation of one or more products is not successful, the UAV is restricted from delivering such products to the delivery destination.

12 Claims, 4 Drawing Sheets

(56) References Cited

U.S. PATENT DOCUMENTS

| | | |
|---|---|---|
| 9,384,668 B2 | 7/2016 | Raptopoulos |
| 9,489,852 B1 | 11/2016 | Chambers |
| 9,505,494 B1 | 11/2016 | Marlow |
| 9,552,736 B2 | 1/2017 | Taveira |
| 9,557,742 B2 | 1/2017 | Paduano |
| 2002/0016726 A1 | 2/2002 | Ross |
| 2009/0281929 A1 | 11/2009 | Boitet |
| 2010/0082151 A1 | 4/2010 | Young |
| 2015/0120094 A1 | 4/2015 | Kimchi |
| 2016/0033966 A1 | 2/2016 | Farris |
| 2016/0068265 A1 | 3/2016 | Hoareau |
| 2016/0239798 A1 | 8/2016 | Borley |
| 2017/0032315 A1 | 2/2017 | Gupta |
| 2017/0068881 A1 | 3/2017 | Camper |
| 2017/0083979 A1 | 3/2017 | Winn |
| 2017/0090484 A1 | 3/2017 | Obaidi |
| 2018/0074162 A1* | 3/2018 | Jones ................... G01S 5/14 |
| 2018/0089622 A1* | 3/2018 | Burch .................. G06K 7/1413 |
| 2018/0143131 A1* | 5/2018 | Choi ..................... G01M 3/38 |
| 2019/0034868 A1* | 1/2019 | Konanur ............ G06Q 10/0832 |
| 2019/0039749 A1* | 2/2019 | Fonk ................. B64D 45/0015 |

FOREIGN PATENT DOCUMENTS

| | | |
|---|---|---|
| WO | 2016094067 | 6/2016 |
| WO | 2016164577 | 10/2016 |

OTHER PUBLICATIONS

PCT; App. No. PCT/US2018/047641; International Search Report and Written Opinion dated Oct. 16, 2018.

\* cited by examiner

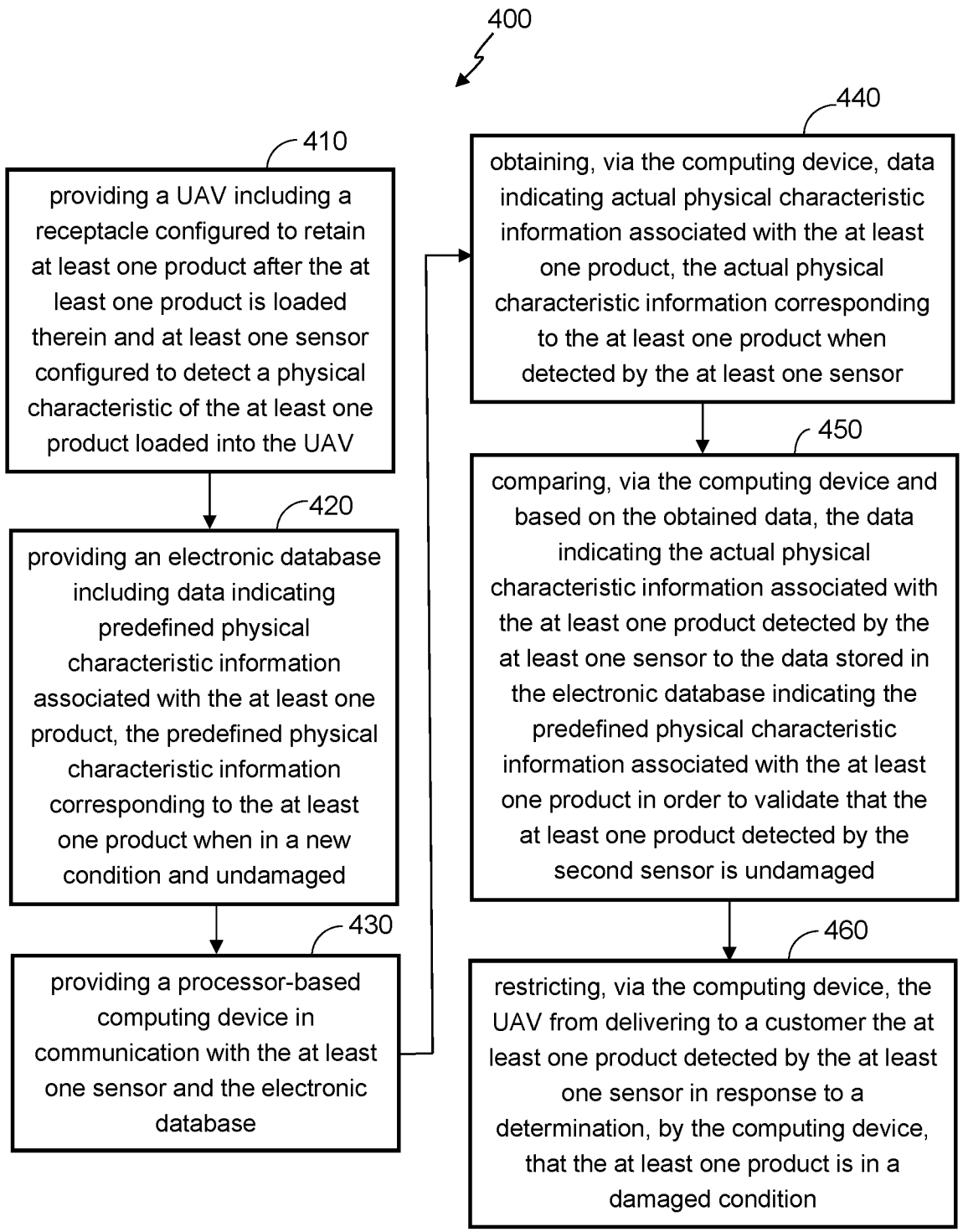

SYSTEMS AND METHODS FOR VALIDATING PRODUCTS TO BE DELIVERED BY UNMANNED AERIAL VEHICLES

CROSS-REFERENCE TO RELATED APPLICATION

This application claims the benefit of U.S. Provisional Application No. 62/551,350, filed Aug. 29, 2017, which is incorporated herein by reference in its entirety.

TECHNICAL FIELD

This disclosure relates generally to for validating products to be delivered to customers, and, in particular, to validating products to be delivered to customers via unmanned aerial vehicles.

BACKGROUND

Product delivery using unmanned aerial vehicles (UAVs) is becoming a popular idea. The UAVs are typically loaded with the products to be delivered at a product distribution facility and/or a deployment station and fly over significant distances to delivery destinations, where they land to drop off one or more products to a customer. It is important for customer satisfaction that the product that is delivered to a customer corresponds to the product ordered by the customer and that the product is delivered in an undamaged condition. However, products may be damaged during sorting prior to being loaded into the UAVs and/or during the flight of the UAVs, and/or during the landing of the UAVs at the delivery destination. In addition, it is not uncommon for the wrong products to be loaded into the UAVs due to human error. Delivery of a damaged or incorrect product to a customer does not only represent a wasteful delivery trip that will lead to a requested return/exchange by the customer (which inevitably translates to undesired additional costs to a retailer), but may also make the customer unsatisfied with the retailer enough so as to not to order from that retailer again, leading to a customer loss for a retailer.

BRIEF DESCRIPTION OF THE DRAWINGS

Disclosed herein are embodiments of systems, apparatuses, methods, and systems pertaining to for validating products to be delivered to customers via unmanned aerial vehicles. This description includes drawings, wherein:

FIG. 4 is a flow chart diagram of a process of for validating products to be delivered to customers via unmanned aerial vehicles in accordance with some embodiments.

Figure 1:
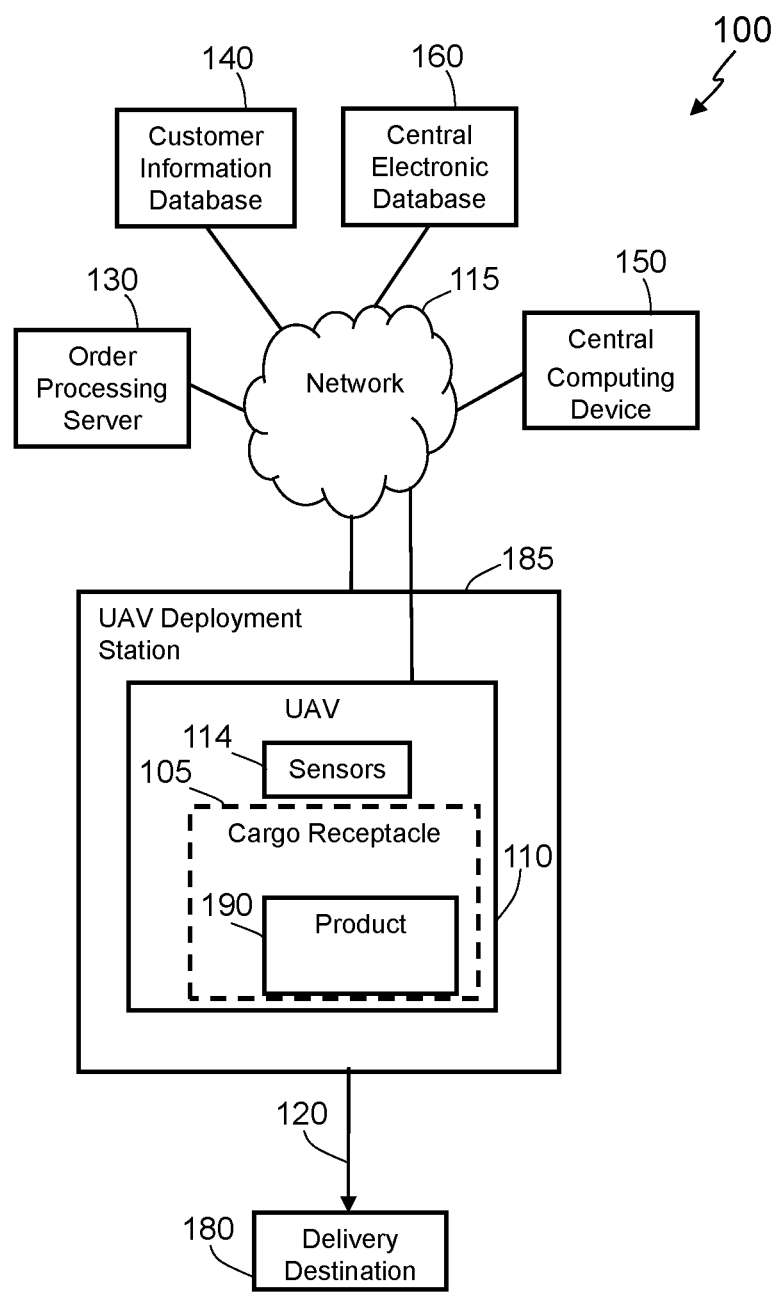
FIG. 1 is a diagram of a system for validating products to be delivered to customers via unmanned aerial vehicles in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for validating products to be delivered to customers via unmanned aerial vehicles.

In some embodiments, a system for validating products to be delivered to customers via unmanned aerial vehicles includes at least one unmanned aerial having a receptacle configured to retain at least one product after the at least one product is loaded therein and at least one sensor configured to detect a physical characteristic of the at least one product. The system further includes an electronic database including data indicating predefined physical characteristic information associated with the at least one product, the predefined physical characteristic information corresponding to the at least one product when in a new condition and undamaged. The system further includes a processor-based computing device in communication with the at least one sensor and the electronic database. The computing device is configured to: obtain data indicating actual physical characteristic information associated with the at least one product, the actual physical characteristic information corresponding to the at least one product when detected by the at least one sensor; and based on the obtained data, to: compare the data indicating the actual physical characteristic information associated with the at least one product detected by the at least one sensor to the data stored in the electronic database indicating the predefined physical characteristic information associated with the at least one product in order to validate that the at least one product detected by the second sensor is undamaged; and restrict the at least one unmanned aerial vehicle from delivering to a customer the at least one product detected by the at least one sensor in response to a determination, by the computing device, that the at least one product is in a damaged condition.

A method for validating products to be delivered to customers via unmanned aerial vehicles, the method including: providing at least one unmanned aerial vehicle having a receptacle configured to retain at least one product after the at least one product is loaded therein and at least one sensor configured to detect a physical characteristic of the at least one product; providing an electronic database including data indicating predefined physical characteristic information associated with the at least one product, the predefined physical characteristic information corresponding to the at least one product when in a new condition and undamaged; providing a processor-based computing device in communication with the at least one sensor and the electronic database; obtaining, via the computing device, data indicating actual physical characteristic information associated with the at least one product, the actual physical characteristic information corresponding to the at least one product when detected by the at least one sensor; comparing, via the computing device and based on the obtained data, the data indicating the actual physical characteristic information associated with the at least one product detected by the at least one sensor to the data stored in the electronic database indicating the predefined physical characteristic information associated with the at least one product in order to validate that the at least one product detected by the second sensor is undamaged; and restricting, via the computing device, the at least one unmanned aerial vehicle from delivering to a customer the at least one product detected by the at least one sensor in response to a determination, by the computing device, that the at least one product is in a damaged condition.

FIG. 1 shows an embodiment of a system 100 for validating products 190 to be delivered to customers via unmanned aerial vehicles (UAVs) 110. It will be understood that the details of this example are intended to serve in an illustrative capacity and are not necessarily intended to suggest any limitations in regards to the present teachings. In some aspects, the exemplary UAV 110 of FIG. 1 is configured to transport one or more products 190 from one or more UAV deployment stations 185 to one or more delivery destinations 180 (which may be product drop off or product pick up locations) and vice versa via a flight route 120.

A customer may be an individual or business entity. A delivery destination 180 may be a home, work place, or another location designated by the customer when placing the order. Exemplary products 190 that may be ordered by the customer via the system 100 may include, but are not limited to, general-purpose consumer goods (retail products and goods not for sale) and consumable products (e.g., food items, medications, or the like). A UAV deployment station 185 can be mobile (e.g., vehicle-mounted) or stationary (e.g., installed at a facility of a retailer). A retailer may be any entity operating as a brick-and-mortar physical location and/or a website accessible, for example, via an intranet, internet, or another network, by way of which products 190 may be ordered by a consumer for delivery via a UAV 110.

The exemplary system 100 depicted in FIG. 1 includes an order processing server 130 configured to process a purchase order by a customer for one or more products 190. It will be appreciated that the order processing server 130 is an optional component of the system 100, and that some embodiments of the system 100 are implemented without incorporating the order processing server 130. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 115. The network 115 may be a wide-area network (WAN), a local area network (LAN), a personal area network (PAN), a wireless local area network (WLAN), Wi-Fi, Zigbee, Bluetooth, or any other internet or intranet network, or combinations of such networks. Generally, communication between various electronic devices of system 100 may take place over hardwired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 communicates with a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, billing address, previous delivery addresses, phone number, product order history, pending order status, product order options, as well as product delivery options (e.g., delivery by UAV) of the customer. The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based.

In the embodiment of FIG. 1, the order processing server 130 is in communication with a central electronic database 160 configured to store information associated with the inventory of products 190 made available by the retailer to the customer, as well as information associated with the UAVs 110 being deployed to deliver products 190 to the delivery destinations 180 specified by the customers. In some aspects, the central electronic database 160 stores information including but not limited to: information associated with the products 190 being transported by the UAV 110; inventory (e.g., on-hand, sold, replenishment, etc.) information associated with the products 190; flight status information associated with the UAV 110; information associated with predetermined flight routes 120 of the UAV 110; status input information detected by one or more sensors 114 of the UAV 110 during flight along the predetermined flight route 120.

In some embodiments, the central electronic database 160 of FIG. 1 is configured to store electronic data associated with the products 190 being loaded into the UAV 110, which data is received from the central computing device 150 (and/or another computing device) and/or is acquired by one or more of the sensors 114 of the UAV 110 and transmitted to the central electronic database 160 by the UAV 110 over the network 115. Electronic data that may be stored in the central electronic database 160 includes but is not limited to: physical characteristic information and/or identifying information associated with the products 190 (e.g., barcode and/or other identifying indicia); date of purchase of the products 190; price of purchase of the products 190; weight of the product 190 being loaded into the UAV 110 when the product 190 is in a new condition and undamaged; actual weight of the product 190 when scanned by a sensor 114 of the 110 (e.g., during loading of the product 190 into the UAV 110 or during flight of the UAV 110 along the route 120); digital image (indicating a shape) of the product 190 being loaded into the UAV 110 when the product 190 is in a new condition and undamaged; digital image of the actual product 190 when scanned by a sensor 114 of the UAV 110 (e.g., during loading of the product 190 into the UAV 110 or during flight of the UAV 110 along the route 120); delivery destination pertaining to the products 190; delivery vehicle loading location (e.g., UAV deployment station 185) and delivery vehicle scheduling information associated with the products 190; and information (e.g., name, address, payment information, etc.) pertaining to one or more consumers (or other intended recipients) associated with the products 190 being loaded into the UAV 110.

The central electronic database 160 may be stored, for example, on non-volatile storage media (e.g., a hard drive, flash drive, or removable optical disk) internal or external to the order processing server 130, or internal or external to computing devices separate and distinct from the order processing server 130. The central electronic database 160 may likewise be cloud-based. While the customer information database 140 and the central electronic database 160 are shown in FIG. 1 as two separate databases, it will be appreciated that the customer information database 140 and the central electronic database 160 can be incorporated into one database.

With reference to FIG. 1, the central computing device 150 may be a stationary or portable electronic device, for example, a desktop computer, a laptop computer, a tablet, a mobile phone, or any other electronic device including a processor-based control circuit (i.e., control unit). For purposes of this specification, the term "central computing device" will be understood to refer to a computing device owned by the retailer or any computing device owned and/or operated by an entity (e.g., delivery service) having an obligation to deliver products 190 for the retailer. In the embodiment of FIG. 1, the central computing device 150 is configured for data entry and processing as well as for communication with other devices of system 100 via the network 115 which, as described above. In some embodiments, as will be described below, the central computing device 150 is configured to receive sensor data from the UAV 110 and/or access the central electronic database 160 and/or access the customer information database 140 via the network 115 to facilitate delivery of products 190 via UAVs 110 along flight routes 120 to delivery destinations 180, and to restrict the UAVs 110 from delivering products 190 determined by the central computing device 150 to be in a damaged condition, not corresponding to the order information (or payment information) submitted by a customer, or otherwise in a condition that is not suitable for delivery to a customer at the delivery destination 180.

In the system 100 of FIG. 1, the central computing device 150 is in two-way communication with the UAV 110 via the network 115. For example, the central computing device 150 can be configured to transmit at least one signal to the UAV 110 to cause the UAV 110 to fly along a flight route 120 determined by the central computing device 150 and/or to deviate from a predetermined flight route 120 (e.g., to return to the UAV deployment station 185 instead of proceeding to the delivery destination 180) while transporting products 190 from the UAV deployment station 185 to the intended delivery destination 180, or while returning from the delivery destination 180 to the UAV deployment station 185. In some aspects, after a customer places an on order for one or more products 190 and specifies a delivery destination 180 for the products 190 via the order processing server 130, prior to and/or after the commencement of a delivery attempt of the products 190 ordered by the customer via a UAV 110 to the delivery destination 180, the central computing device 150 is configured to obtain GPS coordinates associated with the delivery destination 180 selected by the customer and GPS coordinates associated with the UAV deployment station 185 of the retailer, and to determine a flight route 120 for the UAV 110 in order to deliver the customer-ordered products 190 from the UAV deployment station 185 to the delivery destination 180.

Figure 3:
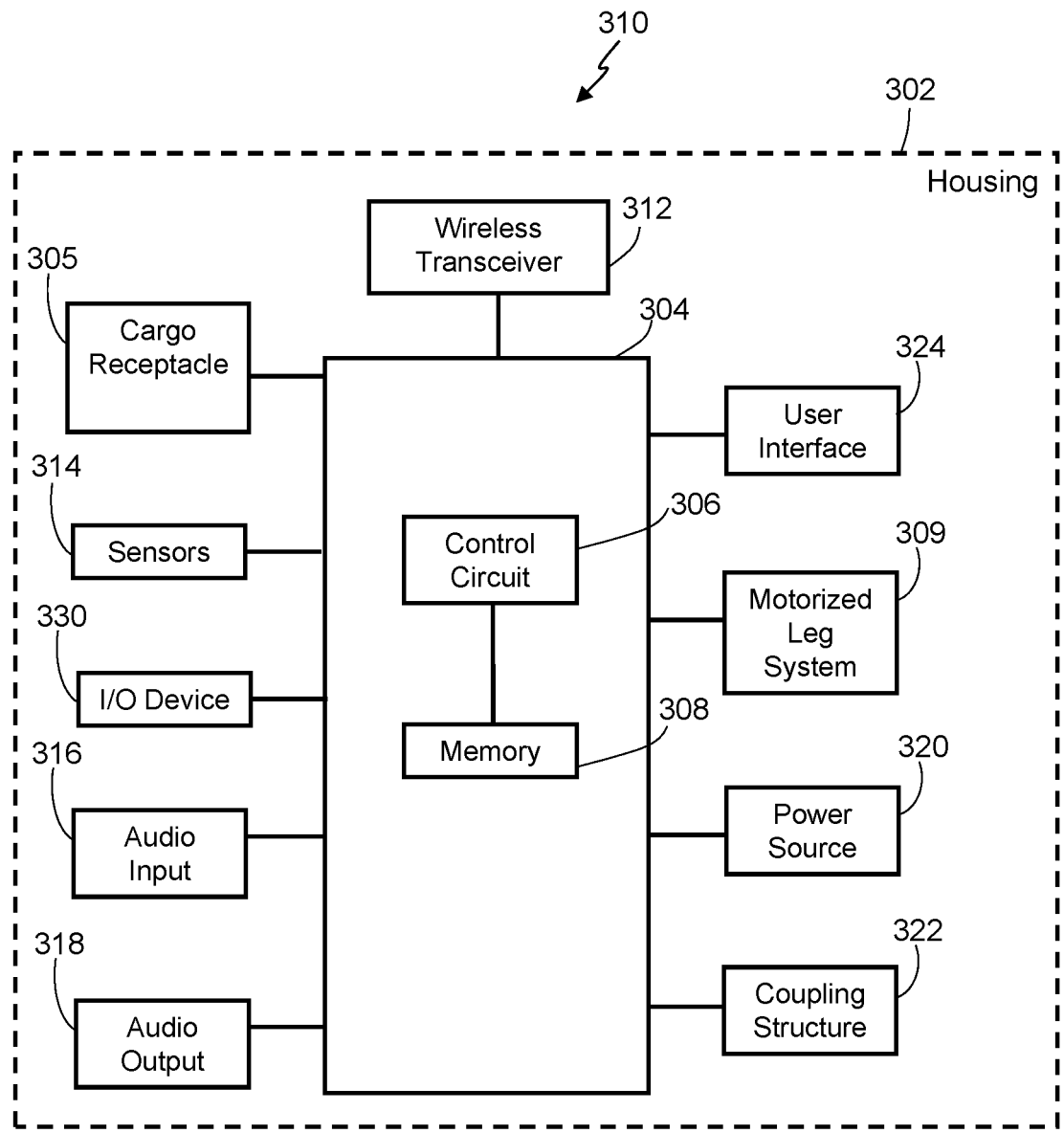
FIG. 3 comprises a block diagram of an unmanned aerial vehicle as configured in accordance with some embodiments.

The UAV 110, which will be discussed in more detail below with reference to FIG. 3, is generally an unmanned aerial vehicle configured to autonomously traverse one or more intended environments in accordance with one or more flight routes 120 determined by the central computing device 150, and typically without the intervention of a human or a remote computing device, while retaining the products 190 therein and delivering the products 190 to the delivery destination 180. In some instances, however, a remote operator or a remote computer (e.g., central computing device 150) may temporarily or permanently take over operation of the UAV 110 using feedback information (e.g., audio and/or video content, sensor information, etc.) communicated from the UAV 110 to the remote operator or computer via the network 115, or another similar distributed network. While only one UAV 110 is shown in FIG. 1 for ease of illustration, it will be appreciated that in some embodiments, the central computing device 150 may communicate with, and/or provide flight route instructions to more than one (e.g., 5, 10, 20, 50, 100, 1000, or more) UAVs 110 simultaneously to guide the UAVs 110 to transport products 190 to their respective delivery destinations 180 while monitoring the condition of the products 190 being transported by the UAVs to ensure that the products 190 being delivered by the UAVs 110 are in a condition suitable for delivery to the customers and correspond to the customers' placed orders.

Figure 2:
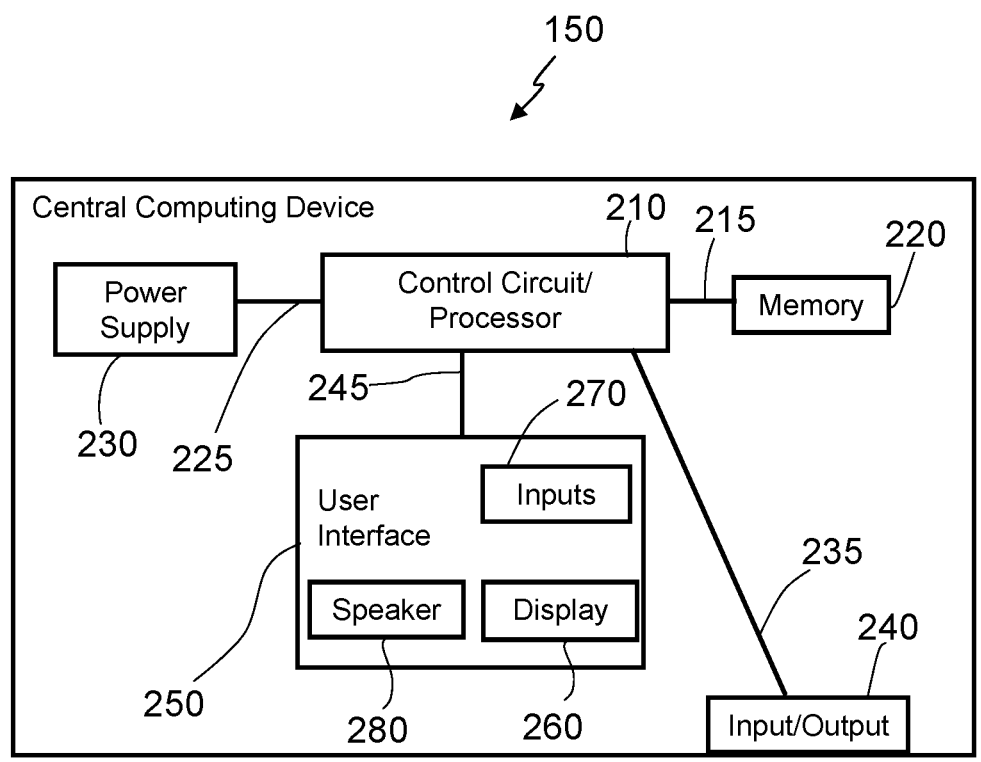
FIG. 2 is a functional diagram of an exemplary computing device usable with the system of FIG. 1 in accordance with some embodiments.

With reference to FIG. 2, an exemplary central computing device 150 configured for use with the systems and methods described herein may include a control unit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the central computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Thus, the memory and/or the control circuit may be referred to as a non-transitory medium or non-transitory computer readable medium.

The control circuit 210 of the central computing device 150 is also electrically coupled via a connection 235 to an input/output 240 that can receive signals from the UAV 110 and/or order processing server 130 and/or customer information database 140 and/or central electronic database 160 (e.g., sensor data representing at least one status input associated with the product 190 during the loading of the product 190 into the UAV 110 and/or during flight of the UAV 110 along the flight route 120; data relating to an order for a product 190 placed by the customer, location data (e.g., GPS coordinates) associated with the delivery destination 180 selected by the customer, etc.), or from any other source that can communicate with the central computing device 150 via a wired or wireless connection.

The input/output 240 of the central computing device 150 can also send signals to the UAV 110 (e.g., a control signal indicating a flight route 120 determined by the central computing device 150 for the UAV 110 in order to deliver the product 190 from the UAV deployment station 185 to the delivery destination 180; a control signal instructing the UAV 110 to abort the flight mission to the delivery destination 180 and to return to the UAV deployment station 185, etc.). The input/output 240 of the central computing device 150 can also send signals to the order processing server 130 (e.g., notification indicating that the UAV 110 was unable to successfully deliver the product 190 to the delivery destination 180 due to an emergency landing), and/or to the central electronic database 160 (e.g., forwarding sensor data received from the UAV 110 or an altered flight route 170 after the UAV 110 is rerouted from its original flight route 120, etc.), and/or to an electronic device that controls movement of an apparatus (e.g., conveyor, robotic arm, etc.) that loads the products 190 into the UAV 110, and/or to an electronic device of a worker that manually loads the products 190 into the UAV 110.

In the embodiment of FIG. 2, the processor-based control circuit 210 of the central computing device 150 is electrically coupled via a connection 245 to a user interface 250, which may include a visual display or display screen 260 (e.g., LED screen) and/or button input 270 that provide the user interface 250 with the ability to permit an operator of the central computing device 150 to manually control the central computing device 150 by inputting commands via touch-screen and/or button operation and/or voice commands to, for example, to transmit to the UAV 110 a control signal indicating a flight route 120 determined by the central computing device 150 for the UAV 110 in order to deliver the product 190 from the UAV deployment station 185 to the delivery destination 180 or a control signal instructing the UAV 110 to abort the flight mission to the delivery destination 180 and to return to the UAV deployment station 185 (e.g., if a sensor 114 of the UAV 110 detects that the product 190 has been damaged in flight or fraudulently/maliciously replaced by another product at a previous drop off point or an unauthorized landing). It will be appreciated that the performance of such functions by the processor-based control circuit 210 of the central computing device 150 is not dependent on a human operator, and that the control circuit 210 may be programmed to perform such functions without a human operator.

In some aspects, the display screen 260 of the central computing device 150 is configured to display various graphical interface-based menus, options, and/or alerts that may be transmitted to the central computing device 150 and displayed on the display screen 260 in connection with various aspects of the delivery of the products 190 ordered by the customers by the UAVs 110, as well as various aspects of analyzing the actual physical characteristic information associated with the products 190 being loaded into and/or transported by the UAV 110, and determining whether to permit the UAV 110 to accept the products 190 being loaded therein and/or whether to permit the UAV 110 to continue along its flight route 120 toward the delivery destination 180. The inputs 270 of the central computing device 150 may be configured to permit an operator to navigate through the on-screen menus on the central computing device 150 and change and/or update the flight route 120 of the UAV 110 toward or away from the delivery destination 180 and/or to guide a UAV 110 transporting a product that has been damaged during flight back toward the UAV deployment station 185. It will be appreciated that the display screen 260 may be configured as both a display screen and an input 270 (e.g., a touch-screen that permits an operator to press on the display screen 260 to enter text and/or execute commands.)

In some embodiments, after an order for one or more products 190 is placed by a customer via the order processing server 130, and prior to commencement of the delivery attempt of one or more products 190 via the UAV 110 to the delivery destination 180 designated by the customer, the control circuit 210 of the central computing device 150 is programmed to obtain the GPS coordinates of the delivery destination 180 where the product 190 is to be delivered by the UAV 110. For example, in embodiments, where the customer requested delivery of a product 190 or products 190 to a delivery destination 180 associated with a specific geographic location (e.g., home address, work address, etc.), the control circuit 210 of the central computing device 150 obtains the GPS coordinates associated with the delivery destination 180, for example, from the customer information database 140, or from another source configured to provide GPS coordinates associated with a given physical address.

In some embodiments, the control circuit 210 of the central computing device 150 is configured to analyze the GPS coordinates of both the UAV deployment station 185 and the delivery destination 180, and to determine and generate a flight route 120 for the UAV 110. In one aspect, the flight route 120 determined by the central computing device 150 is based on a starting location of the UAV 110 (e.g., a UAV deployment station 185) and the intended destination of the UAV 110 (e.g., delivery destination 180 and/or product pick up destination). In some aspects, the central computing device 150 is configured to calculate multiple possible flight routes 120 for the UAV 110, and then select a flight route 120 determined by the central computing device 150 to provide an optimal flight time and/or flight conditions for the UAV 110 while flying along the original flight route 120. In some embodiments, after the control circuit 210 of the central computing device 150 determines and generates a flight route 120 for the UAV 110, the central computing device 150 transmits, via the output 240 and over the network 115, a signal including the flight route 120 to the UAV 110 assigned to deliver one or more products 190 from the UAV deployment station 185 to the delivery destination 180.

In some embodiments, the central computing device 150 is capable of integrating 2D and 3D maps of the navigable space of the UAV 110 along the flight route 120 determined by the central computing device 150, complete with topography data comprising: no fly zones along the flight route 120 and on-ground buildings, hills, bodies of water, power lines, roads, vehicles, people, and/or known safe landing points for the UAV 110 along the flight route 120. After the central computing device 150 maps all in-air and on-ground objects along the flight route 120 of the UAV 110 to specific locations using algorithms, measurements, and GPS geo-location, for example, grids may be applied sectioning off the maps into access ways and blocked sections, enabling the UAV 110 to use such grids for navigation and recognition. The grids may be applied to 2D horizontal maps along with 3D models. Such grids may start at a higher unit level and then can be broken down into smaller units of measure by the central computing device 150 when needed to provide more accuracy.

In some aspects, both prior to the UAV 110 being deployed from the UAV deployment station 185 (i.e., while one or more products 190 are being loaded into the UAV 110 for transportation to the delivery destination 180), and after the UAV 110 has been deployed from the UAV deployment station 185 (i.e., while the UAV 110 is in flight toward the delivery destination 180), the control circuit 210 of the central computing device 150 is programmed to obtain data indicating actual physical characteristic information associated with the product(s) 190 being loaded into (or located in the cargo receptacle 105) of the UAV 110 (which data is detected by one or more sensors 114 of the UAV 110). In some embodiments, based on such obtained sensor data, the control circuit 210 of the central computing device 150 is programmed to compare the data indicating the actual physical characteristic information associated with the product 190 detected (during product loading or during the flight of the UAV 110) by the sensor 114 of the UAV 110 to the data stored in the central electronic database 160 indicating the predefined physical characteristic information associated with that product 190 in order to validate that the product 190 detected by the sensor 114 of the UAV 110 is undamaged.

In some aspects, in response to a determination, by the control circuit 210 of the central computing device 150 that the actual physical characteristic information obtained by the sensor 114 of the UAV 110 during product loading indicates that the product 190 is in a damaged condition, the control circuit 210 of the central computing device 150 is programmed to restrict the UAV 110 from delivering the damaged product 190 to the customer by transmitting a signal (to the UAV 110 or a product loading device or worker) including instructions not to load the damaged product 190 into the UAV 110. In other aspects, in response to a determination the control circuit 210 of the central computing device 150 that the actual physical characteristic information obtained after the UAV 110 has been deployed and is in flight indicates that the product 190 located in a the cargo receptacle 105 of the UAV 110 is in a damaged condition, the control circuit 210 of the central computing device 150 is configured to restrict the UAV 110 from delivering the damaged product 190 to the customer by transmitting a signal that instructs the UAV 110 to abort the delivery of the damaged product 190 to the delivery destination 180, and to return to the UAV deployment station 185 with the damaged product 190 instead of continuing along the route 120 and dropping off the damaged product 190 at the delivery destination 180. Conversely, if the central computing device 150 is able to successfully validate the actual physical characteristic of the product 190 being transported by the UAV 110 as described above, the control circuit 210 of the central computing device 150 is programmed, in response to a successful validation that the product 190 being transported is in an undamaged condition, to permit the UAV 110 to continue transporting the product 190 toward the delivery destination 180.

In some embodiments, prior to the UAV 110 being deployed from the UAV deployment station 185, and while one or more products 190 are being loaded into the cargo receptacle 105 of the UAV 110 for transportation to the delivery destination 180, the control circuit 210 of the central computing device 150 is programmed to obtain data indicating actual identifying characteristic information associated with the product(s) 190 being loaded into the UAV 110 (which data is detected by one or more sensors 114 of the UAV 110). In some embodiments, based on such obtained sensor data, the control circuit 210 of the central computing device 150 is programmed to compare the data indicating the actual identifying characteristic information associated with the product 190 detected by the sensor 114 of the UAV 110 to the data stored in the central electronic database 160 indicating the predefined identifying characteristic information associated with that product 190 in order to validate that the product 190 detected by the sensor 114 of the UAV 110 corresponds to the product 190 that must be loaded into the UAV 110 to correctly fulfill the order placed by the customer.

In some aspects, in response to a determination, by the control circuit 210 of the central computing device 150 that the actual identifying characteristic information obtained by the sensor 114 of the UAV 110 during product loading indicates that the product 190 is not valid (e.g., does not correspond to the order information submitted by a customer), the control circuit 210 of the central computing device 150 is programmed to restrict the UAV 110 from delivering the damaged product 190 to the customer by transmitting a signal (to the UAV 110 or a product loading device or worker) including instructions not to load the invalid product 190 into the UAV 110. In other aspects, in response to a determination the control circuit 210 of the central computing device 150 that the actual identifying characteristic information obtained after the UAV 110 has been deployed and is in flight indicates that the product 190 located in a the cargo receptacle 105 of the UAV 110 is invalid in view of the order placed by the customer, the control circuit 210 of the central computing device 150 is configured to restrict the UAV 110 from delivering such a product 190 to the customer by transmitting a signal that instructs the UAV 110 to abort the delivery of the invalid product 190 to the delivery destination 180, and to return to the UAV deployment station 185 with the invalid product 190 instead of continuing along the route 120 and dropping off the invalid product 190 at the delivery destination 180. Conversely, if the central computing device 150 is able to successfully validate the actual identifying characteristic of the product 190 being transported by the UAV 110 as described above, the control circuit 210 of the central computing device 150 is programmed, in response to a successful validation that the product 190 being transported corresponds to the customer's order information, to permit the UAV 110 to continue transporting the product 190 toward the delivery destination 180.

As discussed above, in some embodiments, the control circuit 210 of the central computing device 150 is programmed to validate physical characteristics and/or validate the identity of a product 190 being loaded into the UAV 110, and to restrict the UAV 110 from delivering a product 190 determined, during product loading and based on the sensor data detected by one or more sensors 114 of the UAV 110, to be not new and/or in a damaged condition and/or containing hazardous/dangerous materials, and/or inconsistent with the product 190 actually ordered by the customer, by preventing the product 190 from being loaded into the UAV 110.

In some aspects, if the central computing device 150 receives sensor data from one or more sensors of the UAV 110 indicating that the product 190 appears to be damaged (e.g., actual weight of the scanned product 190 detected by the sensor 114 does not match the predefined weight of this product 190 when new and undamaged (stored in the central electronic database 160)), the control circuit 210 of the central computing device 150 is programmed to transmit over the network 115 a control signal to an automatic loading device (e.g., conveyor, robotic arm, etc.) containing instructions not to load the damaged product 190 into the UAV 110, but to reroute the damaged product 190 back to a sorting station or a disposal station. In another aspect, if the central computing device 150 receives sensor data from one or more sensors 114 of the UAV 110 indicating that the product 190 appears to be damaged (e.g., the actual shape of the scanned product 190 detected by the sensor 114 does not match the predefined shape of this product 190 when new and undamaged (stored in the central electronic database 160)), the control circuit 210 of the central computing device 150 is programmed to transmit over the network 115 a control signal to the UAV 110 to prevent the damaged product 190 from being loaded into the cargo receptacle of the UAV 110 (e.g., by closing the cargo receptacle of the UAV 110). Conversely, if the central computing device 150 is able to successfully validate the actual physical characteristic (and/or the actual identifying characteristic) of the product 190 being loaded into the UAV 110 as described above, the control circuit 210 of the central computing device 150 is programmed, in response to a successful validation that the product 190 being loaded is in a new and undamaged condition and corresponds to the order information entered by the customer, to permit the verified product 190 to be loaded into the cargo receptacle of the UAV 110.

In some aspects, the products 190 may be loaded into the UAV 110 manually by a worker at the UAV deployment station 185 (or at a product distribution facility of the retailer), and the control circuit 210 of the central computing device 150 is programmed to, prior to the product 190 being loaded into the cargo receptacle 105 of the UAV 110 and in response to an unsuccessful validation that the actual physical characteristic information (detected by a sensor 114 of the UAV 110 in association with the product 190 being loaded) indicates that the product 190 is in a new and undamaged condition, to transmit an electronic error message to an electronic device of a worker of a facility (e.g., distribution center, UAV deployment station 185, etc.) where the product 190 is being loaded into the UAV 110. After receiving such an error message from the central computing device 150, the worker would not load the product 190 into the UAV 110 and would reroute the product 190 towards a sorting and/or disposal station. Conversely, in some aspects, the control circuit 210 of the central computing device 150 is programmed to, prior to the product 190 being loaded into the cargo receptacle 105 of the UAV 110 and in response to a successful validation that the actual physical characteristic information (detected by a sensor of the UAV 110 in association with the product 190 being loaded) indicates that the product 190 is in a new and undamaged condition, to transmit an electronic confirmation message to an electronic device of a worker of a facility where the product 190 is being loaded into the UAV 110. After receiving such an confirmation message from the central computing device, the worker would load the product 190 into the UAV 110 for delivery to the delivery destination 180.

FIG. 3 presents a more detailed exemplary embodiment of the UAV 310 of FIG. 1. In this example, the UAV 310 has a housing 302 that contains (partially or fully) or at least supports and carries a number of components. These components include a cargo receptacle 305 sized and shaped to retain one or more products 190 to be transported by the UAV 310 and control unit 304 comprising a control circuit 306 that, like the control circuit 210 of the central computing device 150, controls the general operations of the UAV 310. The control unit 304 includes a memory 308 coupled to the control circuit 306 for storing data such as operating instructions and/or useful data.

In some embodiments, the control circuit 306 operably couples to a motorized leg system 309. This motorized leg system 309 functions as a locomotion system to permit the UAV 310 to land onto the ground or onto a landing pad at the delivery destination 180 and/or to move laterally at the delivery destination 180 or at the UAV deployment station 185. Various examples of motorized leg systems are known in the art. Further elaboration in these regards is not provided here for the sake of brevity save to note that the control circuit 306 may be configured to control the various operating states of the motorized leg system 309 to thereby control when and how the motorized leg system 309 operates.

In the exemplary embodiment of FIG. 3, the control circuit 306 operably couples to at least one wireless transceiver 312 that operates according to any known wireless protocol. This wireless transceiver 312 can comprise, for example, a cellular-compatible, Wi-Fi-compatible, and/or Bluetooth-compatible transceiver that can wirelessly communicate with the central computing device 150 via the network 115. So configured, the control circuit 306 of the UAV 310 can provide information (e.g., sensor input) to the central computing device 150 (via the network 115) and can receive information and/or movement (e.g., routing and rerouting) instructions from the central computing device 150. These teachings will accommodate using any of a wide variety of wireless technologies as desired and/or as may be appropriate in a given application setting. These teachings will also accommodate employing two or more wireless transceivers 312.

In some embodiments, the wireless transceiver 312 is configured as a two-way transceiver that can receive a signal containing instructions including the flight route 120 and/or rerouting information transmitted from the central computing device 150, and that can transmit one or more signals to the central computing device 150. For example, the control circuit 306 can receive a first control signal from the central computing device 150 via the network 115 containing instructions regarding directional movement of the UAV 310 along a specific, central computing device-determined flight route 120 when, for example: flying from the UAV deployment station 185 to the delivery destination 180 to drop off and/or pick up a product 190, or when returning from the delivery destination 180 after dropping off or picking up a product 190 to the UAV deployment station 185. In particular, as discussed above, the central computing device 150 can be configured to analyze GPS coordinates of the delivery destination 180 designated by the customer, determine a flight route 120 for the UAV 110 to the delivery destination 180, and transmit to the wireless transceiver 312 of the UAV 110 a first control signal including the flight route 120 over the network 115. The UAV 110, after receipt of the first control signal from the central computing device 150, is configured to navigate along the flight route 120, based on the route instructions in the first control signal, to the delivery destination 180.

With reference to FIG. 3, the control circuit 306 of the UAV 310 also couples to one or more on-board sensors 314 of the UAV 310. These teachings will accommodate a wide variety of sensor technologies and form factors. In some embodiments, the on-board sensors 314 can comprise any relevant device that detects and/or transmits at least one status of the UAV 310 during flight of the UAV 110 along the flight route 120. The sensors 314 of the UAV 310 can include but are not limited to: altimeter, velocimeter, thermometer, photocell, battery life sensor, video camera, radar, lidar, laser range finder, and sonar. In some embodiments, the information obtained by one or more sensors 314 of the UAV 310 is used by the UAV 310 and/or the central computing device 150 in functions including but not limited to: navigation, landing, on-the-ground object/people detection, potential in-air threat detection, crash damage assessments, distance measurements, topography mapping, location determination, emergency detection.

In some embodiments, the UAV 310 includes sensors 314 configured to recognize actual physical characteristic information and/or actual identifying characteristic information associated with the products 190 being loaded into and/or transported by the UAV 310. In some aspects, the sensors 314 can detect actual physical characteristic information of the products 190 being loaded into or transported by the UAV 310 including but not limited to: dimensional characteristics (e.g., size and shape) of the product(s) 190; weight of the product(s) 190; volume of the product(s) 190, temperature of the product(s) 190, smell generated by the product(s) 190; exterior texture of the product(s) 190, hazardous material emissions of the product(s) 190, explosive potential of the product(s) 190, tamper-evidence status of the product(s) 190, etc. In some embodiments, the sensors 314 of the UAV 310 are configured to scan identifying indicia located on the product 190 or on the packaging containing the product 190. The identifying indicia on the product 190 that may be scanned by the sensors 314 may include, but is not limited to: two dimensional barcode, RFID, near field communication (NFC) identifiers, ultra-wideband (UWB) identifiers, Bluetooth identifiers, images, or other such optically readable, radio frequency detectable or other such code, or combination of such codes. In some aspects, the sensors 314 of the UAV 310 may include but are not limited to one or more of: a motion-detecting sensor, a photo sensor, a radio frequency identification (RFID) sensor, an optical sensor, a barcode sensor, a digital camera sensor, an x-ray sensor, explosives sensor, hazardous materials sensor, a weight sensor, a size sensor, a volumetric sensor, a smell sensor, and a temperature sensor.

In some aspects, a product identifying characteristic-detecting sensor 314 in the form of a camera provides for image analysis of the product 190, text recognition on the product 190 (e.g., product name), and/or pattern recognition on the product 190 (e.g., color pattern, tamper-evidence seal, barcode pattern, etc.) as the product 190 is being loaded into the cargo receptacle 305 of the UAV 310, or when the product 190 is located in the cargo receptacle 305 of the UAV 310. For example, a camera-based sensor 314 monitoring a product 190 that is a cardboard case (normally having a uniform light brown color pattern) being loaded into or retained during flight in the cargo receptacle 305 of the UAV 310 can acquire a visual of the product 190 and detect a darker patch in the cardboard case, which, when transmitted by the UAV 310 to the central computing device 150, can be interpreted by the control circuit 210 of the central computing device 150 as a hole in the cardboard case and/or evidence of a leak on the cardboard case, in response to which the control circuit 210 of the central computing device 150 can either restrict the product 190 from being loaded into the UAV 310, or reroute the UAV 310 that is already in flight back toward the UAV deployment station 185.

In another example, a camera-based sensor 314 monitoring a product 190 being loaded into or retained during flight in the cargo receptacle 305 of the UAV 310 can acquire a visual of the product 190 and detect that the tamper-evidence/freshness seal on the product 190 is broken, which, when transmitted by the UAV 310 to the central computing device 150, can be interpreted by the control circuit 210 of the central computing device 150 as an indication that the product 190 has been previously opened/tampered with, in response to which the control circuit 210 of the central computing device 150 can either restrict the product 190 from being loaded into the UAV 310, or reroute the UAV 310 that is already in flight back toward the UAV deployment station 185. In yet another example, a camera-based sensor 314 monitoring a product 190 being loaded into or retained during flight in the cargo receptacle 305 of the UAV 310 can acquire a visual of the product 190 and detect that the barcode information associated with the product 190 does not correspond to any products that were ordered by the customer to whom the delivery is intended, which, when transmitted by the UAV 310 to the central computing device 150, can be interpreted by the control circuit 210 of the central computing device 150 as an indication that an incorrect product 190 is being loaded/has been loaded into the UAV 310, in response to which the control circuit 210 of the central computing device 150 can either restrict the product 190 from being loaded into the UAV 310, or reroute the UAV 310 that is already in flight back toward the UAV deployment station 185.

In some aspects, the status input detected and/or transmitted by one or more sensors 314 of the UAV 310 includes but is not limited to location data associated with the UAV 310. Such location data can include, for example GPS coordinates of the UAV 310, marker beacon data along the flight route 120, and way point data along the flight route 120. In some embodiments, the status input detected and/or transmitted by the at least one sensor 314 of the UAV 310 includes UAV status data including but not limited to propeller status, electronics status, communication status, interfering radio frequency (RF) status. In some aspects, the sensors 314 include one or more devices that can be used to capture data related to one or more in-air objects (e.g., other UAVs 310, helicopters, birds, rocks, etc.) located within a threshold distance relative to the UAV 310. For example, the UAV 310 includes at least one on-board sensor 314 configured to detect at least one obstacle between the UAV 310 and the delivery destination 180 designated by the customer. Based on the detection of one or more obstacles by such a sensor 314, the UAV 310 is configured to avoid the obstacle(s). In some embodiments, the UAV 310 may attempt to avoid detected obstacles, and if unable to avoid, to notify the central computing device 150 of such a condition. In some embodiments, using on-board sensors 314 (such as distance measurement units, e.g., laser or other optical-based distance measurement sensors), the UAV 310 detects obstacles in its path, and flies around such obstacles or stops until the obstacle is clear.

In some aspects, the UAV 310 includes sensors 314 configured to recognize environmental elements along the flight route 120 of the UAV 310 toward and/or away from the delivery destination 180. Such sensors 314 can provide information that the control circuit 306 and/or the central computing device 150 can employ to determine a present location, distance, and/or orientation of the UAV 310 relative to one or more in-air objects and/or objects and surfaces at the delivery destination 180. These teachings will accommodate any of a variety of distance measurement units including optical units and sound/ultrasound units. In one example, a sensor 314 comprises an altimeter and/or a laser distance sensor device capable of determining a distance to objects in proximity to the sensor 314. In some embodiments, the UAV 310 includes an on-board sensor 314 (e.g., a video camera) configured to detect map reference and/or topography along the flight route 120 and/or at the delivery destination 180. For example, in some aspects, one or more map reference or topography data acquired by one or more sensors 314 of the UAV 310 includes but is not limited to: no fly zones along the flight route 120, known safe emergency landing points along the flight route 120, on-the-ground people, buildings, vehicles and/or other objects, as well as hills, bodies of water, power lines, roads, and other environmental factors along the flight route 120 and/or at the predicted emergency landing location 125.

In some embodiments, an audio input 316 (such as a microphone) and/or an audio output 318 (such as a speaker) can also operably couple to the control circuit 306 of the UAV 310. So configured, the control circuit 306 can provide for a variety of audible sounds to enable the UAV 310 to communicate with, for example, the central computing device 150 or other UAVs. Such sounds can include any of a variety of tones and/or sirens and/or other non-verbal sounds. Such audible sounds can also include, in lieu of the foregoing or in combination therewith, pre-recorded or synthesized speech.

In the embodiment illustrated in FIG. 3, the UAV 310 includes a rechargeable power source 320 such as one or more batteries. The power provided by the rechargeable power source 320 can be made available to whichever components of the UAV 310 require electrical energy. By one approach, the UAV 310 includes a plug or other electrically conductive interface that the control circuit 306 can utilize to automatically connect to an external source of electrical energy (e.g., a charging dock) to recharge the rechargeable power source 320.

These teachings will also accommodate optionally selectively and temporarily coupling the UAV 310 to another structure or electronic device (e.g., landing pad at delivery destination 180, deployment dock at the UAV deployment station 185, etc.). In such aspects, the UTV 310 includes a coupling structure 322. By one approach such a coupling structure 322 operably couples to a control circuit 306 to thereby permit the latter to control movement of the UTV 310 (e.g., via hovering and/or via the motorized leg system 309) towards a particular landing location until the coupling structure 322 can engage a complementary structure at the target landing location to thereby temporarily physically couple the UAV 310 to a landing pad or deployment dock, for example.

In some embodiments, the UAV 310 includes an input/output (I/O) device 330 that is coupled to the control circuit 306. The I/O device 330 allows an external device to couple to the control unit 304. The function and purpose of connecting devices will depend on the application. In some examples, devices connecting to the I/O device 330 may add functionality to the control unit 304, allow the exporting of data from the control unit 304, allow the diagnosing of the UAV 310, and so on.

In some embodiments, the UAV 310 includes a user interface 324 including for example, user inputs and/or user outputs or displays depending on the intended interaction with the user (e.g., a worker of a retailer or UAV delivery service or customer). For example, user inputs could include any input device such as buttons, knobs, switches, touch sensitive surfaces or display screens, and so on. Example user outputs include lights, display screens, and so on. The user interface 324 may work together with or separate from any user interface implemented at an optional user interface unit (such as a smart phone or tablet device) usable by the worker.

In some embodiments, the UAV 310 may be controlled by a user in direct proximity to the UAV 310, for example, an operator of the UAV deployment station 185 (e.g., a driver of a moving vehicle), or by a user at any location remote to the location of the UAV 310 (e.g., regional or central hub operator). This is due to the architecture of some embodiments where the central computing device 150 outputs control signals to the UAV 310. These controls signals can originate at any electronic device in communication with the central computing device 150. For example, the signals sent to the UAV 310 may be movement instructions determined by the central computing device 150 and/or initially transmitted by a device of a user to the central computing device 150 and in turn transmitted from the central computing device 150 to the UAV 310.

The control unit 304 of the UAV 310 includes a memory 308 coupled to a control circuit 306 and storing data such as operating instructions and/or other data. The control circuit 306 can comprise a fixed-purpose hard-wired platform or can comprise a partially or wholly programmable platform. These architectural options are well known and understood in the art and require no further description. This control circuit 306 is configured (e.g., by using corresponding programming stored in the memory 308 as will be well understood by those skilled in the art) to carry out one or more of the steps, actions, and/or functions described herein. The memory 308 may be integral to the control circuit 306 or can be physically discrete (in whole or in part) from the control circuit 306 as desired. This memory 308 can also be local with respect to the control circuit 306 (where, for example, both share a common circuit board, chassis, power supply, and/or housing) or can be partially or wholly remote with respect to the control circuit 306. This memory 308 can serve, for example, to non-transitorily store the computer instructions that, when executed by the control circuit 306, cause the control circuit 306 to behave as described herein. It is noted that not all components illustrated in FIG. 3 are included in all embodiments of the UAV 310. That is, some components may be optional depending on the implementation.

With reference to FIGS. 1 and 3 and as mentioned above, after receiving one or more sensor inputs detected by one or more sensors 314 of the UAV 310 while products 190 are being loaded into the UAV 310 and/or while the UAV 310 is in flight along the flight route 120 determined by the central computing device 150, the control circuit 210 of the central computing device 150 is programmed to analyze one or more of the received status inputs in order to determine whether to permit the UAV 310 to accept the products 190 being loaded and/or to permit the UAV 310 to continue transporting the products 190 along its flight route 120 toward the delivery destination 180. In some aspects, as discussed above, the control circuit 210 of the central computing device 150 is programmed to restrict the UAV 310 from delivering a product 190 to a customer during the loading of the product 190 into the UAV 310 or while the UAV 310 is already in flight along the route 120 if, for example, the identifying characteristic and/or physical characteristic of the product cannot be validated with reference to the predefined identifying characteristic data and/or physical characteristic data stored in the central electronic database 160.

In certain configurations, the system 100 may be configured such that the control circuit 306 of the UAV 310 and not the control circuit 210 of the central computing device 150 analyzes the sensor inputs detected by one or more sensors 314 of the UAV 310 and determines whether to permit a product 190 to be loaded into the UAV 310 and/or to permit the UAV 310 to continue flying along its route 120 toward the delivery destination 180. In such configurations, the processing requirements of the central computing device 150 can be greatly reduced. For example, in some embodiments, the UAV 310 is configured such, after receiving one or more sensor inputs detected by one or more sensors 314 of the UAV 310 while products 190 are being loaded into the UAV 310 and/or while the UAV 310 is in flight along the flight route 120 determined by the central computing device 150, the control circuit 306 of the UAV 310 is programmed to analyze one or more of the received status inputs in order to determine whether to permit the UAV 310 to accept the products 190 being loaded and/or to permit the UAV 310 to continue transporting the products 190 along its flight route 120 toward the delivery destination 180. In some aspects, the control circuit 306 of the UAV 310 is programmed to restrict the UAV 310 from delivering a product 190 to a customer during the loading of the product 190 into the UAV 310 or while the UAV 310 is already in flight along the route 120 if, for example, the identifying characteristic and/or physical characteristic of the product cannot be validated with reference to the predefined identifying characteristic data and/or physical characteristic data stored in the central electronic database 160.

FIG. 4 shows an embodiment of an exemplary method 400 of validating products 190 to be delivered to customers via UAVs 110. The embodiment of the method 400 illustrated in FIG. 4 includes providing a UAV 310 including a cargo receptacle 305 configured to retain at one or more product(s) 190 after the product(s) 190 is/are loaded into the receptacle 305, and one or more sensor(s) 314 configured to detect a physical characteristic of the product(s) 190 loaded into the UAV 310 (step 410). The exemplary also method 400 includes providing a central electronic database 160 including data indicating predefined physical characteristic information associated with the product(s) 190, with the predefined physical characteristic information corresponding to the product(s) 190 when in a new condition and undamaged (step 420). Further, the exemplary method 400 includes providing a central processor-based computing device 150 in communication with the sensor(s) 314 and the central electronic database 160 (step 430).

As described above, the sensors 314 of the UAV 310 are configured to detect various identifying characteristics and/or physical characteristics of the products 190 both when the products 190 are being loaded into the cargo receptacle 305 of the UAV 310 and while the products 190 are being transported in the cargo receptacle 305 of the UAV 310 during flight along the route 120. To that end, the method 400 depicted in FIG. 4 includes obtaining, via the central computing device 150, data indicating actual physical characteristic information associated with the product(s) 190, with the actual physical characteristic information corresponding to the product(s) 190 when detected by the sensor(s) 314 (step 440). In some aspects, the method 400 can include obtaining, via the central computing device 150, data indicating actual identifying characteristic information associated with the product(s) 190, with the actual identifying characteristic information corresponding to the product(s) 190 when detected by the sensor(s) 314.

After the central computing device 150 obtains (e.g., over the network 115) the sensor data detected by the sensors 314 of the UAV 110 during the loading of the product(s) 190 into the UAV 310 or when the UAV 310 is in flight, the method 400 of FIG. 4 includes comparing, via the central computing device 150 and based on the obtained sensor data, the data indicating the actual physical characteristic information associated with the product(s) 190 detected by the sensor(s) 314 of the UAV 310 to the data stored in the central electronic database 160 indicating the predefined physical characteristic information associated with the product(s) 190 in order to validate that the product(s) 190 detected by the second sensor is/are undamaged (step 450). In some aspects, the central computing device 150 also obtains identifying characteristic information associated with the products 190 during the loading of the products 190 or while the UAV 310 is in flight, and the method 400 includes comparing, based on the obtained data, the data indicating the actual identifying characteristic information associated with the product(s) 190 detected by the sensor(s) 314 of the UAV 310 to the data stored in the central electronic database 160 indicating the predefined identifying characteristic information associated with the product(s) 190 in order to validate an identity of the product(s) 190 detected by the sensor(s) 314.

As mentioned above, to reduce processing power requirements of the central computing device 150, in some implementations, after the sensor data is detected by the sensors 314 of the UAV 110 during the loading of the product(s) 190 into the UAV 310 or when the UAV 310 is in flight along the route 120, the analysis of such sensor data in order to validate the actual physical characteristic information and/or actual identifying information of the scanned products 190 is performed by the control circuit 306 of the UAV 310, not by the control circuit 210 of the central computing device 150. To that end, in some embodiments, the method 400 can include comparing, via the control circuit 306 of the UAV 310 and based on the obtained sensor data, the data indicating the actual physical characteristic information associated with the product(s) 190 detected by the sensor(s) 314 of the UAV 310 to the data stored in the central electronic database 160 indicating the predefined physical characteristic information associated with the product(s) 190 in order to validate that the product(s) 190 detected by the second sensor is/are undamaged. By the same token, in some aspects, the control circuit 306 of the UAV 310 also obtains identifying characteristic information associated with the products 190 during loading into the UAV 310 or while the UAV 310 is in flight, and the method 400 can include comparing, based on the obtained data, the data indicating the actual identifying characteristic information associated with the product(s) 190 detected by the sensor(s) 314 of the UAV 310 to the data stored in the central electronic database 160 indicating the predefined identifying characteristic information associated with the product(s) 190 to validate an identity of the product(s) 190 detected by the sensor(s) 314.

With reference to FIG. 4, after the control circuit 210 of the central computing device 150 compares the obtains the sensor data detected by the sensors 314 of the UAV 110 during the loading of the product(s) 190 into the UAV 310 or when the UAV 310 is in flight and compares the data indicating the actual physical characteristic information associated with the product(s) 190 detected by the sensor(s) 314 of the UAV 310 to the data stored in the central electronic database 160 indicating the predefined physical characteristic information associated with the product(s) 190 in order to validate that the product(s) 190 detected by the second sensor is/are undamaged, the method 400 further includes restricting, via the central computing device 150, the UAV 310 from delivering to a customer one or more products 190 detected by one or more sensors 314 of the UAV 310 in response to a determination, by the central computing device 150, that such product(s) 190 is/are in a damaged condition (step 460). In some aspects, the central computing device 150 also obtains identifying characteristic information associated with the products 190 during the loading of the products 190 or while the UAV 310 is in flight, and the method 400 includes restricting, via the central computing device 150, the UAV 310 from delivering to a customer the product(s) 190 detected by the sensor(s) 314 in response to a determination, by the central computing device 150, that a validation of the identity of the product(s) 190 has failed. As mentioned above, the control circuit 210 and/or control circuit 306 can be programmed to recognize sensor-detected anomalies other than physical damage or physical identification associated with the products 190, and in some aspects, are programmed to recognize physical characteristic information indicating a broken tamper-evident or freshness seal, gas emissions indicating that the product is not fresh, gas emissions indicative of a toxic gas, or scent emissions associated with explosive materials.

As discussed above, in some implementations, the comparing step 450 is not performed by the control unit 210 of the central computing device 150 but by the control circuit 306 of the UAV 310. By the same token, in some aspects, the control circuit 306 of the UAV 310 performs the restricting step 460 instead of the control circuit 210 of the central computing device 150. In such implementations, the method 400 includes a step of restricting, via the control circuit 306 of the UAV 310 the UAV 310 from delivering to a customer one or more products 190 detected by one or more sensors 314 of the UAV 310 in response to a determination, by the control circuit 306 of the UAV 310, that such product(s) 190 is/are in a damaged condition. Similarly, in some embodiments, the method 400 may include restricting, via the control circuit 306 of the UAV 310, the UAV 310 from delivering to a customer the product(s) 190 detected by the sensor(s) 314 in response to a determination, by the control circuit 306 of the UAV 310, that a validation of the identity of the product(s) 190 has failed. In such embodiments, the UAV 310 does not depend on transmitting a signal including sensor data to the central computing device 150 and receiving analysis-based instructions from the central computing device 150 in order to determine whether to prevent the loading of an anomaly-associated product into the UAV 310 and/or to abort the in-progress delivery of an anomaly-associated product 190 to the customer.

The systems and methods described herein advantageously facilitate validation of the products being loaded into unmanned aerial vehicles as well as products being transported by unmanned aerial vehicles to delivery destinations. The validation of the products during the loading and/or during transportation enables the systems and methods described herein to restrict the unmanned aerial vehicles from delivering products that have not been validated as being undamaged and correct for the order being fulfilled. As such, the systems and methods described herein facilitate delivery of undamaged and correct products to the customers, and thereby provide not only a significant cost savings to operators of unmanned aerial vehicles when performing deliveries of products to customers, but also increase the satisfaction of the customers with the products being delivered to them and with the retailers delivering such products.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for validating products to be delivered to customers via unmanned aerial vehicles, the system comprising:
   at least one unmanned aerial vehicle including:
      a receptacle configured to retain at least one product after the at least one product is loaded therein;
      at least one sensor configured to detect a physical characteristic of the at least one product;
   an electronic database including data indicating predefined physical characteristic information associated with the at least one product, the predefined physical characteristic information corresponding to the at least one product when in a new condition and undamaged; and
   a processor-based computing device in communication with the at least one sensor and the electronic database, the computing device being configured to:
      obtain data indicating actual physical characteristic information associated with the at least one product, the actual physical characteristic information corresponding to the at least one product when detected by the at least one sensor; and
      based on the obtained data, to:
         compare the data indicating the actual physical characteristic information associated with the at least one product detected by the at least one sensor to the data stored in the electronic database indicating the predefined physical characteristic information associated with the at least one product in order to validate that the at least one product detected by the at least one sensor is in a new condition and undamaged;
         restrict the at least one unmanned aerial vehicle from delivering to a customer the at least one product detected by the at least one sensor in response to a determination, by the computing device, that the at least one product is not in the new condition or is in a damaged condition; and
         prior to the at least one product being loaded into the receptacle of the at least one unmanned aerial vehicle, and, in response to an unsuccessful validation of the actual physical characteristic information associated with the at least one product detected by the at least one sensor that the at least one product is in the new condition or is undamaged, transmit an electronic error message to an electronic device of a worker of a facility where the at least one product is being loaded into the at least one unmanned aerial vehicle.

2. The system of claim 1, wherein the at least one sensor is configured to detect at least one identifying characteristic of the at least one product.

3. The system of claim 1, wherein, in response to a determination by the computing device, that a scan of the at least one product by the at least one sensor after the at least one unmanned aerial vehicle has been deployed for delivery of the at least one product indicates that the product is not in the new condition or is in the damaged condition, the computing device is configured to restrict the at least one unmanned aerial vehicle from delivering to a customer the at least one product by transmitting a signal to the at least one unmanned aerial vehicle, the signal configured to instruct the at least one unmanned aerial vehicle to abort the delivery of the at least one product and to return to a deployment station with the at least one product.

4. The system of claim 1, wherein the at least one sensor includes at least one of a motion-detecting sensor, a photo sensor, a radio frequency identification (RFID) sensor, an optical sensor, a barcode sensor, a digital camera sensor, an x-ray sensor, hazardous materials sensor, a weight sensor, a size sensor, a volumetric sensor, a smell sensor, and a temperature sensor.

5. The system of claim 1, wherein the computing device is configured, prior to the at least one product being loaded into the receptacle of the at least one unmanned aerial vehicle and in response to a successful validation of the actual physical characteristic information associated with the at least one product detected by the at least one sensor that the at least one product is in a new and undamaged condition, to permit the at least one product to be loaded into the receptacle of the at least one unmanned aerial vehicle.

6. The system of claim 1, wherein the computing device is configured, after the at least one product is loaded into the receptacle of the at least one unmanned aerial vehicle and while the at least one unmanned aerial vehicle is in flight and in response to a successful validation of the actual physical characteristic information associated with the at least one product detected by the at least one sensor that the at least one product is in a new and undamaged condition, to permit the at least one unmanned aerial vehicle to continue the flight toward a delivery destination.

7. A method for validating products to be delivered to customers via unmanned aerial vehicles, the method comprising:
  providing at least one unmanned aerial vehicle including:
    a receptacle configured to retain at least one product after the at least one product is loaded therein;
    at least one sensor configured to detect a physical characteristic of the at least one product;
  providing an electronic database including data indicating predefined physical characteristic information associated with the at least one product, the predefined physical characteristic information corresponding to the at least one product when in a new condition and undamaged; and
  providing a processor-based computing device in communication with the at least one sensor and the electronic database;
  obtaining, via the computing device, data indicating actual physical characteristic information associated with the at least one product, the actual physical characteristic information corresponding to the at least one product when detected by the at least one sensor;
  comparing, via the computing device and based on the obtained data, the data indicating the actual physical characteristic information associated with the at least one product detected by the at least one sensor to the data stored in the electronic database indicating the predefined physical characteristic information associated with the at least one product in order to validate that the at least one product detected by the at least one sensor is in a new condition and undamaged;
  restricting, via the computing device, the at least one unmanned aerial vehicle from delivering to a customer the at least one product detected by the at least one sensor in response to a determination, by the computing device, that the at least one product is not in the new condition or is in a damaged condition; and
  transmitting, via the computing device and prior to the at least one product being loaded into the receptacle of the at least one unmanned aerial vehicle, and, in response to an unsuccessful validation of the actual physical characteristic information associated with the at least one product detected by the at least one sensor that the at least one product is in the new condition or is undamaged, an electronic error message to an electronic device of a worker of a facility where the at least one product is being loaded into the at least one unmanned aerial vehicle.

8. The method of claim 7, wherein the at least one sensor is configured to detect at least one identifying characteristic of the at least one product.

9. The method of claim 7, further comprising, determining, by the computing device, that a scan of the at least one product by the at least one sensor after the at least one unmanned aerial vehicle has been deployed for delivery of the at least one product indicates that the product is not in the new condition or is in the damaged condition, and restricting, via the computing device, the at least one unmanned aerial vehicle from delivering to a customer the at least one product by transmitting a signal to the at least one unmanned aerial vehicle, the signal configured to instruct the at least one unmanned aerial vehicle to abort the delivery of the at least one product and to return to a deployment station with the at least one product.

10. The method of claim 7, wherein the at least one sensor includes at least one of a motion-detecting sensor, a photo sensor, a radio frequency identification (RFID) sensor, an optical sensor, a barcode sensor, a digital camera sensor, an x-ray sensor, hazardous materials sensor, a weight sensor, a size sensor, a volumetric sensor, a smell sensor, and a temperature sensor.

11. The method of claim 7, further comprising, permitting, via the computing device, and prior to the at least one product being loaded into the receptacle of the at least one unmanned aerial vehicle and in response to a successful validation of the actual physical characteristic information associated with the at least one product detected by the at least one sensor that the at least one product is in a new and undamaged condition, the at least one product to be loaded into the receptacle of the at least one unmanned aerial vehicle.

12. The method of claim 7, further comprising permitting, via the computing device and after the at least one product is loaded into the receptacle of the at least one unmanned aerial vehicle and while the at least one unmanned aerial vehicle is in flight and in response to a successful validation of the actual physical characteristic information associated with the at least one product detected by the at least one sensor that the at least one product is in a new and undamaged condition, the at least one unmanned aerial vehicle to continue the flight toward a delivery destination.

* * * * *